United States Patent [19]

Yoshida et al.

[11] Patent Number: 5,236,735

[45] Date of Patent: Aug. 17, 1993

[54] METHOD OF PRODUCING A THIN FILM MAGNETIC HEAD

[75] Inventors: Makoto Yoshida; Yuzuru Iwai; Noboru Yamanaka; Jun Shouzi; Tsutomu Koyanagi; Mikio Matsuzaki; Nobuya Ohyama; Yoshiaki Tanaka, all of Tokyo, Japan

[73] Assignee: TDK Corporation, Tokyo, Japan

[21] Appl. No.: 715,012

[22] Filed: Jun. 13, 1991

Related U.S. Application Data

[63] Continuation of Ser. No. 528,754, May 25, 1990, abandoned.

[30] Foreign Application Priority Data

May 27, 1989 [JP] Japan .................. 1-133355

[51] Int. Cl.⁵ .......................................... C23C 14/00
[52] U.S. Cl. ........................................ 427/96; 427/130; 427/131
[58] Field of Search ........................ 427/96, 130, 131

[56] References Cited

U.S. PATENT DOCUMENTS

| | | | |
|---|---|---|---|
| 3,860,450 | 1/1975 | Nicolet | 427/96 |
| 4,003,768 | 1/1977 | Anderson et al. | |
| 4,143,458 | 3/1979 | Gibson | 29/603 |
| 4,190,872 | 2/1980 | Jones, Jr. et al. | |
| 4,219,854 | 8/1980 | Church et al. | |
| 4,224,381 | 9/1980 | Patel | 427/130 |
| 4,242,710 | 12/1980 | Hempstead et al. | |
| 4,386,114 | 5/1983 | Harms | 427/130 |
| 4,489,105 | 12/1984 | Lee | 427/131 |
| 4,608,297 | 8/1986 | Shimada | 360/126 |
| 4,650,726 | 3/1987 | Yamaguchi | 501/134 |
| 4,652,954 | 3/1987 | Church | 427/130 |
| 4,677,036 | 6/1987 | Nakamura | 427/130 |
| 4,685,014 | 8/1987 | Hanazono | 360/126 |
| 4,839,197 | 6/1989 | Henderson | 427/131 |
| 4,841,624 | 6/1989 | Togawa | 427/131 |
| 4,863,557 | 9/1989 | Kokaku | 427/131 |
| 4,878,290 | 11/1989 | Masud | 427/131 |
| 4,899,434 | 2/1990 | Roberts | 427/130 |
| 4,966,648 | 10/1990 | Nakamura | 427/131 |
| 5,066,552 | 11/1991 | Howard | 427/130 |

FOREIGN PATENT DOCUMENTS

| | | |
|---|---|---|
| 12912 | 7/1980 | European Pat. Off. |
| 5708 | 1/1979 | Japan ............... 427/130 |

OTHER PUBLICATIONS

A. J. Griest "Magnetic Film Memory Devices" IBM Technical Disclosure Bulletin, vol. 13, No. 7, Dec. 1970, p. 1810.

E. Max "Thin Film Magnetic Head" IBM Technical Disclosure Bulletin vol. 13, No. 1, Jun. 1970 pp. 248-249.

IEE Transaction on Magnetics, vol. 25, No. 5, Sep. 1989, "Delayed Relaxation in Thin-Film Heads", pp. 3212-3214 K. B. Klaassen et al.

*Primary Examiner*—Shrive Beck
*Assistant Examiner*—Vi Duong Dang
*Attorney, Agent, or Firm*—Oblon, Spivak, McClelland, Maier & Neustadt

[57] ABSTRACT

A method of producing a thin film magnetic head comprises forming a thin film magnetic circuit including a magnetic film and a conductive coil film on a substrate, and heating the thin film magnetic circuit at a temperature in a range of from 270° C. to 400° C. before forming a protective layer covering the thin film magnetic circuit.

7 Claims, 6 Drawing Sheets

REPETITION OF THE 1 CYCLE FOR 2 min.

METHOD OF PRODUCING A THIN FILM MAGNETIC HEAD

This application is a continuation of application Ser. No. 07/528,743, filed on May 25, 1990, now abandoned.

BACKGROUND OF THE INVENTION

1. Field of the Invention

The present invention relates to a method of producing a thin film magnetic head for in-plane recording and reproducing or vertical recording and reproducing. More particularly, it relates to a method of producing a thin film magnetic head capable of drastically reducing a popcorn noise or a noise after write by heating a thin film magnetic circuit on a substrate at a temperature of 270° C.–400° C. before forming a protective layer.

2. Discussion of Background

For the thin film magnetic head, there have been known two systems, i.e. an in-plane recording and reproducing system and a vertical recording and reproducing system.

FIG. 1 is a perspective view of an important part of the thin film magnetic head for in-plane recording and reproducing disclosed in, for instance, Japanese Unexamined Patent Publication No. 84019/1980 and FIG. 2 is a cross-sectional view of the important part. In FIGS. 1 and 2, a reference numeral 1 designates a substrate, a numeral 2 designates a lower magnetic film, a numeral 3 designates a gap film made of a material such as alumina, a numeral 4 designates an upper magnetic film, a numeral 5 designates a conductive coil film, numerals 61–63 designate insulating films composed of an organic insulation resin such as novlak resin, numerals 7 and 8 designate leading parts, a numeral 9 designates an insulating film and a numeral 10 designates a protective layer.

The substrate is so constructed that an insulating film 102 such as $Al_2O_3$ or the like is formed on a ceramic structural body 101 of a material such as $Al_2O_3$·TiC or the like. The thin film magnetic head is obtained by manufacturing steps wherein a number of thin magnetic head elements are formed on a single substrate and then, the substrate is cut to separate it into thin film magnetic heads. Accordingly, the substrate is generally in a form of wafer.

Each end of the magnetic films 2 and 4 constitute pole portions 21, 41 which oppose through a gap film 3 made of a material such as alumina and which serve for writing and reading.

The conductive coil film 5 constitutes a thin film magnetic circuit in association with the magnetic films 2, 4 and the gap film 3. The conductive coil film 5 has a laminated structure wherein a conductive film 5B is formed by Cu plating on an undercoat conductive film 5A which is formed by the sputtering of Cu/Ti. The conductive coil film 5 is formed in a spiral form around the connect portions of the magnetic films 2 and 4 to yoke portions 22, 42.

The protective layer 10 is formed on the thin film magnetic circuit by spattering alumina so that it protects the thin film magnetic head device which is constituted by the magnetic films 2, 4, the gap film 3, the conductive coil films 5 and the interlayer insulating films 61–63. FIG. 1 shows the state of the thin film magnetic head device before the protective layer is formed.

The conventional thin film magnetic head has, however, such a disadvantage that when it is subjected to a reading operation after a write signal has been given with an interval of time of, for instance, about 10 μs–20 μs therebetween, a pulse-like noise which has an extremely higher peak value than that of an ordinary white noise takes place is a reading signal.

FIG. 3 shows an oscilloscope waveform in which pulse-like noises are contained in a white noise signal, wherein the abscissa has a scale indicated by a unit time of 0.5 μs and the ordinate has a scale indicated by a unit voltage of 30 μV. Below the waveform, there is shown a time chart of writing and reading operations with its time axis in coincidence with the time axis of the abscissa. As is clear in FIG. 3, a pulse-like noise $P_P$ having a peak value which is much higher than the level of a white noise $P_w$ is generated 1.5 μs–2.5 μs after a point of time $t_O$ as a standard. When a leading operation is started at $t_O$ after a writing operation has been stopped. The noise $P_P$ is called, in a field of this art, as a popcorn noise or an excess noise or a noise after write.

The mechanism of the generation of the popcorn noise $P_P$ is not entirely clear. However, it is considered that a main cause resides in a delay of forming magnetized areas at the magnetic films 2, 4 when the operation is moved from a writing operation to a stationary state. Since the magnetic films 2, 4 have magnetic anisotropy, the direction of a magnetized area which is in alignment with a direction of the axis $H_H$ of hindering magnetization (as shown in FIG. 4) at the time of the writing operation is changed to a direction of the axis $H_E$ of facilitating magnetization, which has an angular difference of 90° from the direction of the axis $H_H$ of hindering magnetization (as shown in FIG. 5) at the time of the stationary state. The popcorn noise $P_P$ is likely generated due to a time lag resulted when the direction of the magnetized areas at the magnetic films 2, 4 is turned from the direction of the axis $H_H$ of hindering magnetization to the direction of the axis $H_E$ of facilitating magnetization.

Since the popcorn noise $P_P$ has its peak value $V_{O-P}$ and it reaches up to 100 $\mu V_{O-P}$, it is impossible to discriminate the popcorn noise from a regular reading signal, whereby an error occurs in reading operations in a magnetic disk drive. The error raises an extremely severe problem since it may reduce the utility of a thin film magnetic head. However, there has been no effective way to solve the problem. There has been proposed measures to take a long time to start a reading operation after a writing operation has been finished (post write recovery time). However, when such measures are to be adopted, it is indispensable to change a system in a magnetic disk drive apparatus, which is practically difficult. Further, the adoption of a long post write recovery time is contradictory to the demand of high density recording.

SUMMARY OF THE INVENTION

It is an object of the present invention to eliminate the problems of the conventional technique and to provide a method of producing a thin film magnetic head capable of drastically reducing a popcorn noise.

The foregoing and other objects of the present invention have been attained by providing a method of producing a thin film magnetic head which comprises forming a thin film magnetic circuit including a magnetic film and a conductive coil film on a substrate, and heating the thin film magnetic circuit at a temperature in a range of from 270° C. to 400° C. before forming a protective layer covering the thin film magnetic circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Preferred embodiments of the present invention now be described.

In the present invention, the occurrence of popcorn noises can be greatly suppressed by heating a thin film magnetic circuit at a temperature of 270° C.–400° C. before forming a protective layer 10 covering the thin film magnetic circuit, although the reason is not clear.

When the thin film magnetic circuit is heated to a temperature more than 270° C., a remarkable effect to reduce the popcorn noises can not be obtained. When it is heated at a temperature of 400° C. or higher, the characteristics of the magnetic films 2, 4 which are formed as permalloy films are deteriorated. Accordingly, it is suitable to heat the magnetic circuit at a temperature ranging from 270° C.–400° C.

When a heat treatment is conducted after the formation of a protective layer 10, there arise problems such as a thermal stress and an interface peeling phenomenon between the protective layer 10 and the magnetic film 4. In order to avoid such problems, the above-mentioned heat treatment should be conducted before the formation of the protective layer 10.

A time for the heat treatment is changed depending on a temperature condition. A treating time of 10 minutes– 120 minutes is suitable in the temperature range of 270° C. –400° C. If the time of heat treatment is too long, there arises a problem of the reduction in thickness of insulating films 61–63. As an example, it is suitable to conduct a heat treatment of about 60 minutes at 320° C. When it exceeds 200 minutes, the reduction in thickness of the films is large.

It is preferable that the heat treatment be conducted in a vacuumed condition at a degree of vacuum of about $10^{-2}$–$10^{-6}$ Torr. The heat treatment in a vacuumed condition is to prevent the carbonization of the insulating films 61–63.

An embodiment of the present invention will be described with reference to the drawings.

Figure 1:
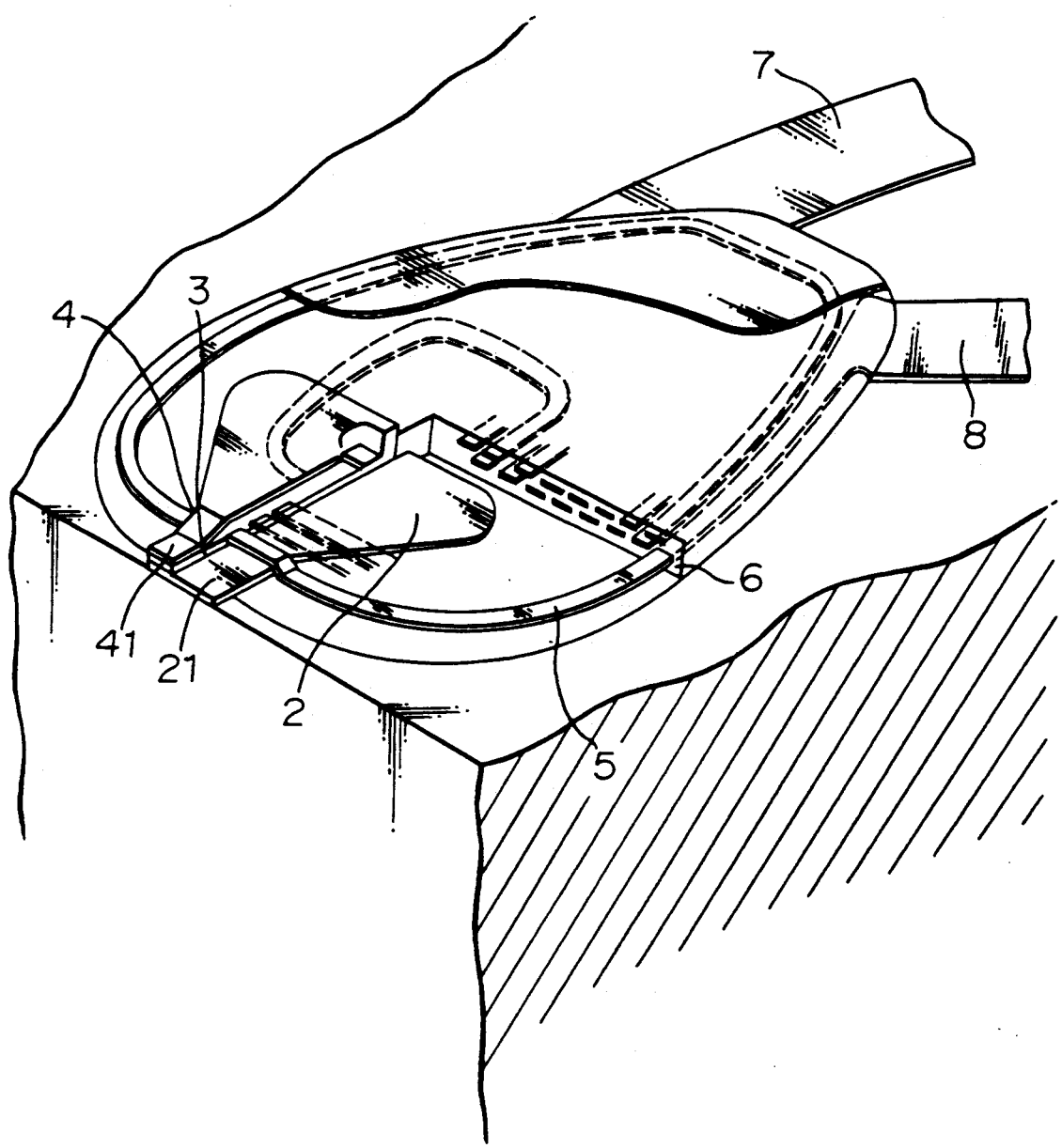
FIG. 1 is a perspective view partly broken of an important part of a thin film magnetic head produced by an embodiment of the method of the present invention.
Figure 2:
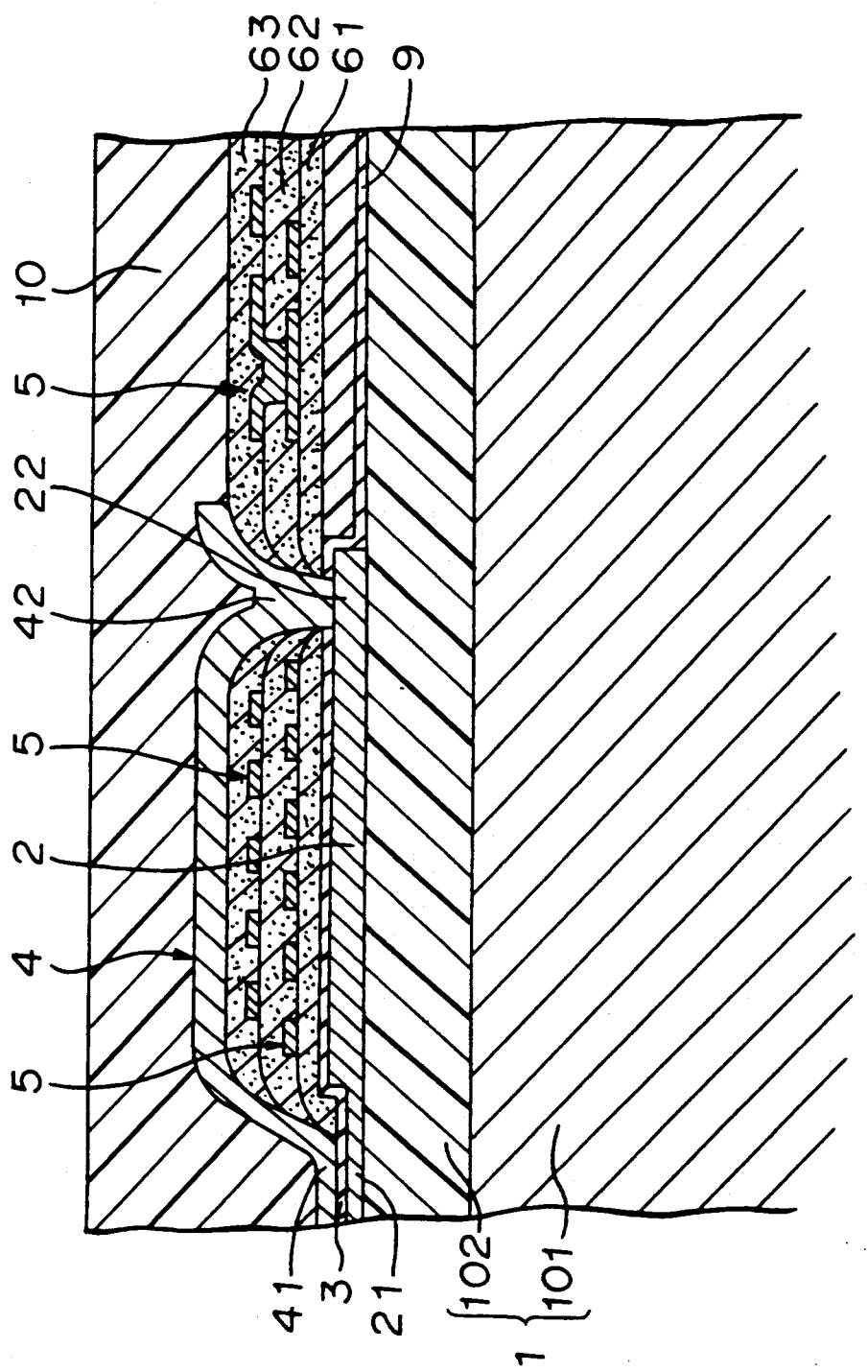
FIG. 2 is a cross sectional view partly broken of an important portion of the thin film magnetic head as shown in FIG. 1.
Figure 3:
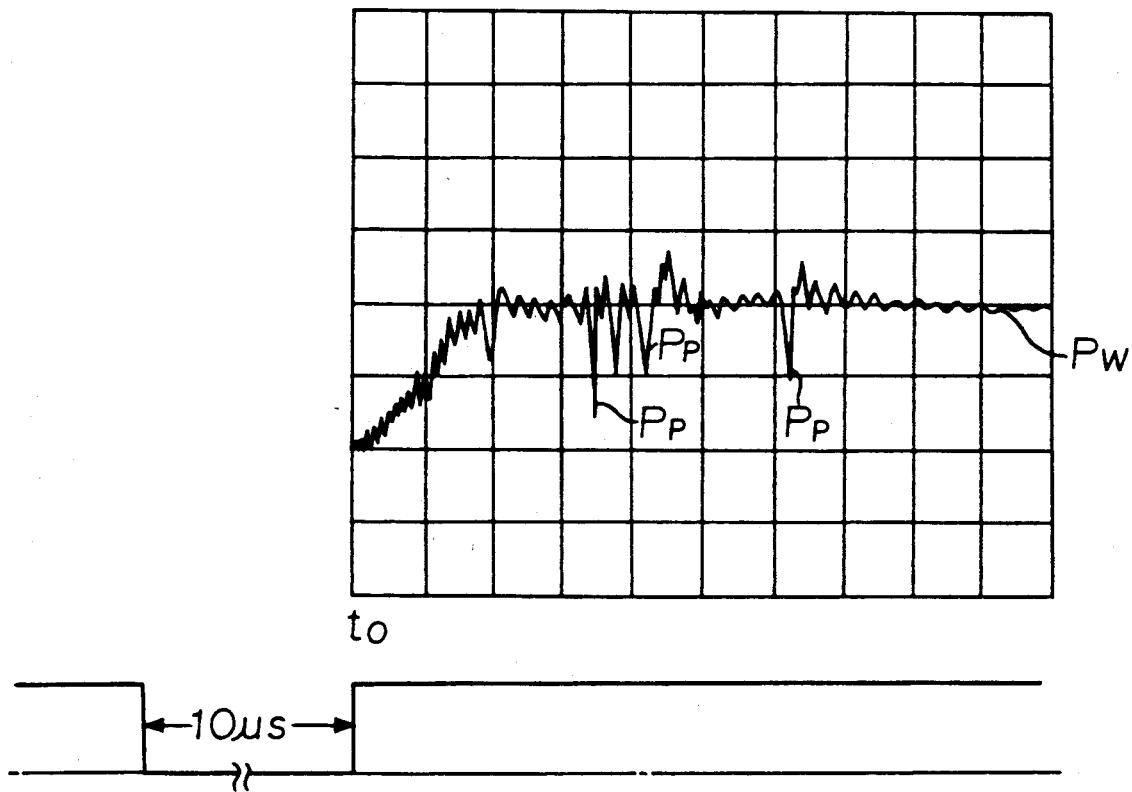
FIG. 3 is a diagram of an oscilloscope waveform showing popcorn noises in white noises.
Figure 4:
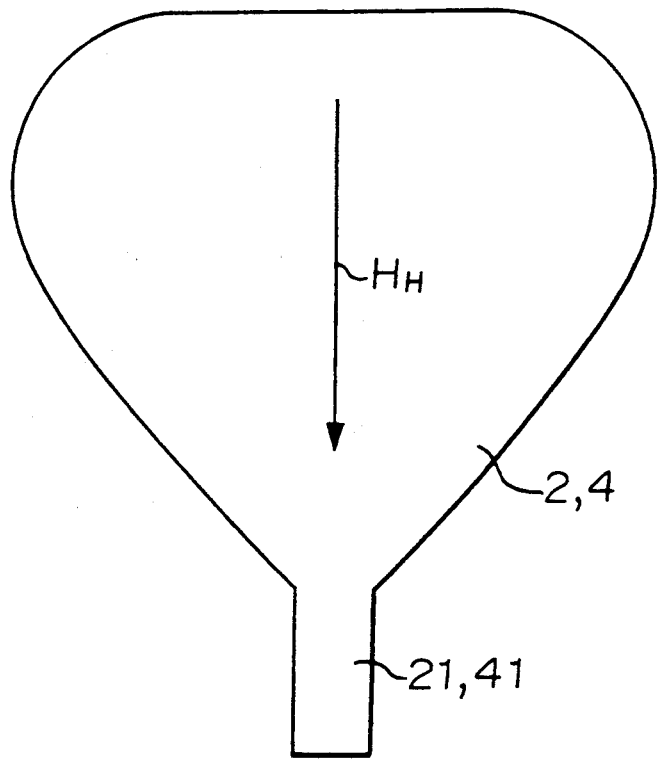
FIG. 4 is a diagram showing the structure of magnetized areas at the time of writing operation.
Figure 5:
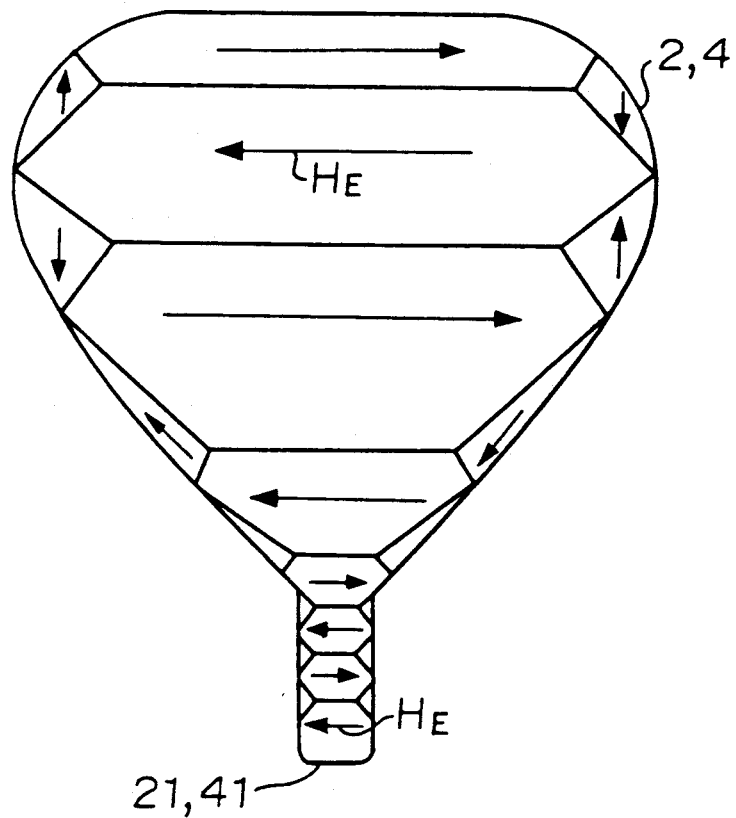
FIG. 5 is a diagram showing the structure of magnetized areas at the time of reading operation.

The thin film magnetic circuit comprising elements 2 through 6 is formed on a substrate 1 which is in a form of wafer as shown in FIG. 1. Then, the thin film magnetic circuit is subjected to a heat treatment for 60 minutes at 320° C. before a protective layer 10 is formed. The heat treatment was conducted in a vacuumed condition having a degree of vacuum of about $10^{-3}$–$10^{-5}$ Torr. The protective layer 10 was formed on the magnetic circuit by a spattering method to obtain a thin film magnetic head having the construction as shown in FIG. 2. In the thin film magnetic head thus formed, the number of turns of the conductive coil film 5 is 32 turns and the resistance is 30Ω.

Figure 6:
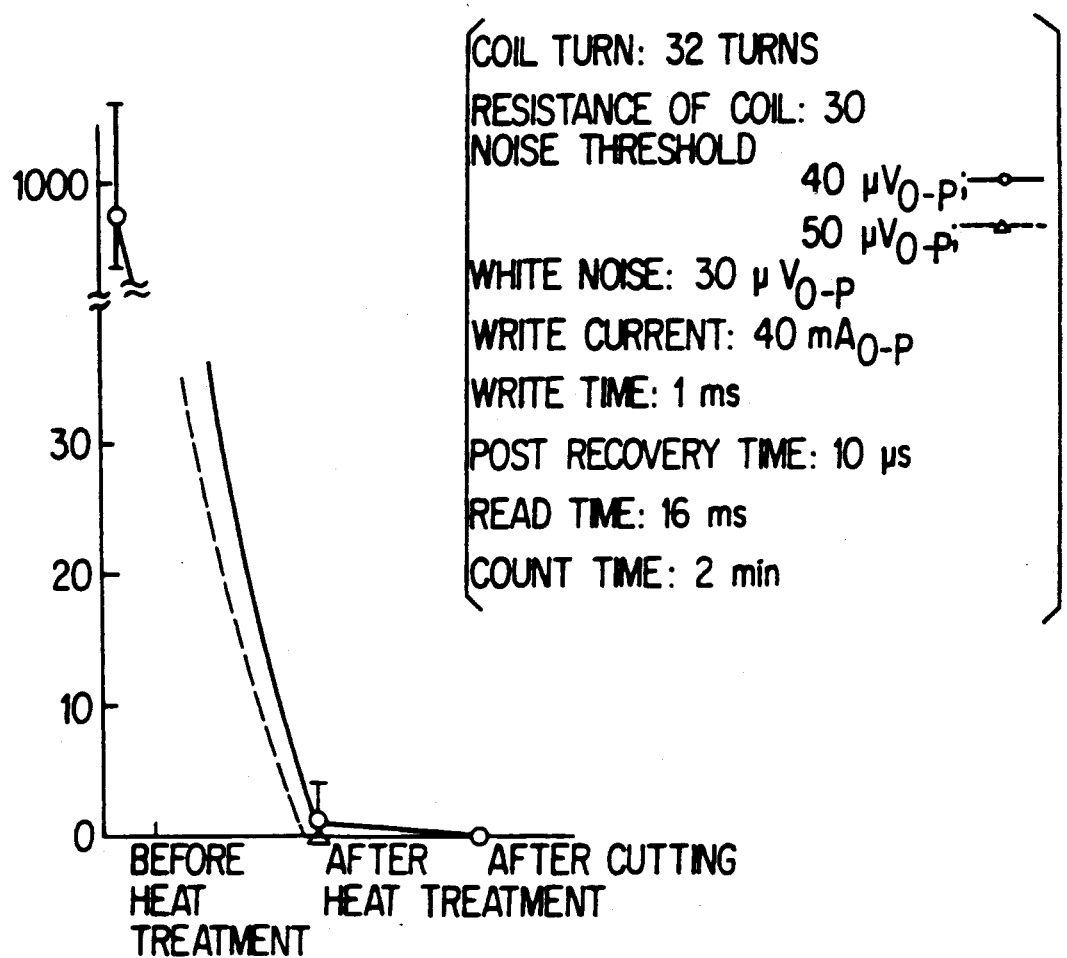
FIG. 6 is a graph showing the number of popcorn noises before and after a heat treatment to a thin film magnetic head.

FIG. 6 is a graph which compares the number of popcorn noises before and after a heat treatment of the above-mentioned magnetic head. As is clear from FIG. 6, popcorn noises can be drastically suppressed from about 1,000 before the heat treatment to substantially 0 after the heat treatment. In FIG. 6, marks ○ indicate the number of popcorn noises when the threshold voltage to detect the noises is determined to be 40 $\mu V_{O-P}$ and a mark $\Delta$ is that of 50 $\mu V_{O-P}$. The same effect of suppressing the popcorn noises could be obtained in either case that a thin film magnetic head is formed on a wafer or a case that a single thin film magnetic head is cut from a wafer.

In the next place, conditions determined to obtain the data as shown in FIG. 6 will be described.

Figure 7:
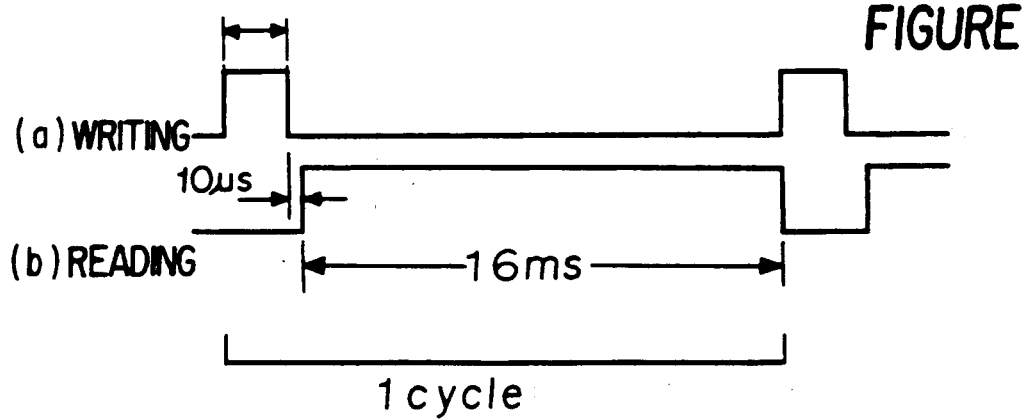
FIG. 7 is time charts of writing and reading operations in order to obtain the data as in FIG. 6.

FIG. 7 shows time charts of writing and reading operations to obtain the data in FIG. 6. In the writing operation, a write current of 40 mA$_{O-P}$ and a write time of 1 ms were used. After the writing operation has finished, a reading operation was conducted after a post write recovery time of 10 $\mu$s. In the reading operation, a read time was 16 ms. A test was conducted for 2 minutes wherein the above-mentioned was taken as 1 cycle. The level of white noises was temporally determined to be 30 $\mu V_{O-P}$, and the noise threshold voltages to detect popcorn noises were respectively determined to be 40 $\mu V_{O-P}$ and 50 $\mu V_{O-P}$ to conduct a test.

Figure 8:
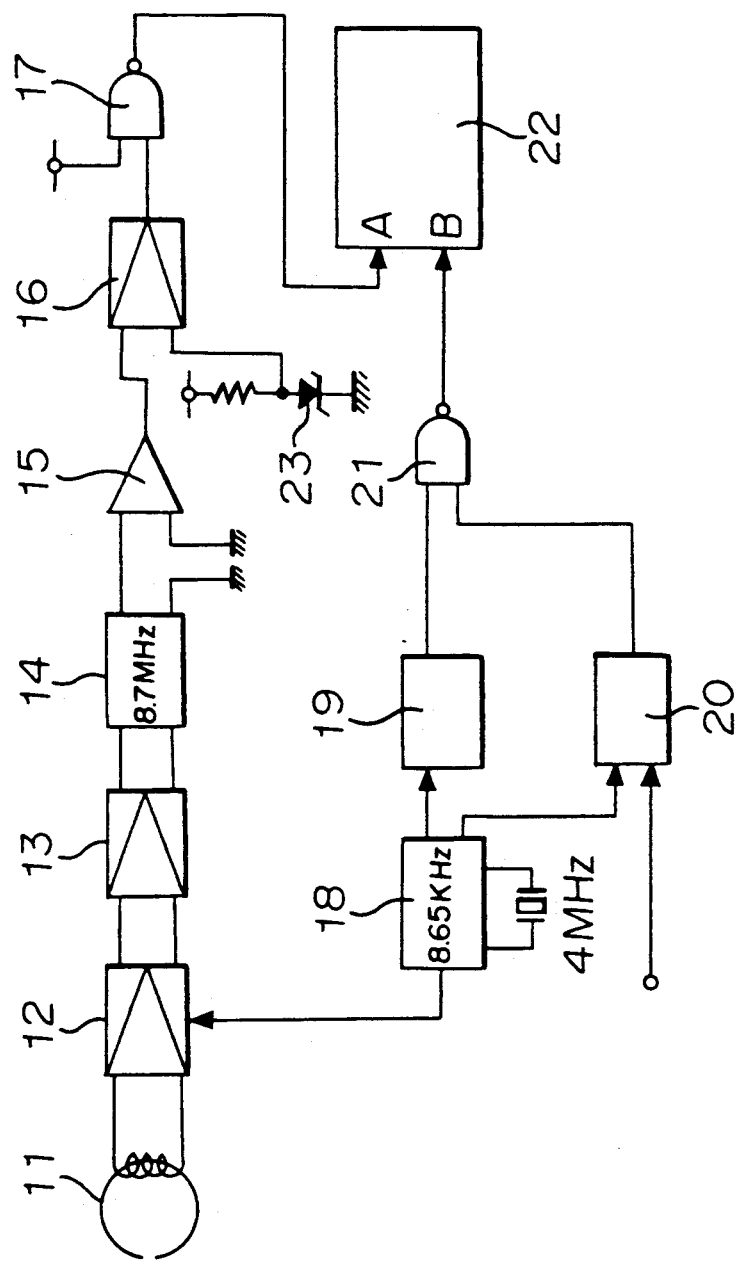
FIG. 8 is a block diagram of a measuring circuit used to obtain the data as shown in FIG. 6.

FIG. 8 is a block diagram of a measuring circuit used to obtain the data in FIG. 6. In FIG. 8, a reference numeral 11 designates a thin film magnetic head, numerals 12, 13 designate amplifiers, a numeral 14 designates a filter, a numeral 15 designates an operation amplifier, a numeral 16 designates a comparator, a numeral 17 designates a logic gate, a numeral 18 designates a switch controller for reading/writing, a numeral 19 designates a gate controller, a numeral 20 designates a gate timer, a numeral 21 designates a logic gate and a numeral 22 designates a popcorn counter.

Reading/writing operations are switched by switching signals given to the amplifier 12 from the switching controller 18 as shown in the time charts in FIG. 7. In the reading operations, signals generated from the thin film magnetic head are amplified at the amplifiers 12, 13, and necessary frequency components of the amplified signals are extracted at the filter 14. Then, the frequency components are input to the comparator 16 through the operation amplifier 15. The comparator 16 compares the signal supplied from the operation amplifier 15 with noise threshold voltage values to detect popcorn noises, the threshold values being determined by a Zener diode, and when the former is greater than the later, an output of logic 1 is generated. The output of logic "1" by comparison is counted by the popcorn noise counter 22 through the logic gate 17. The timing of counting at the popcorn noise counter 22 is determined by a timing signal which is supplied from the logic gate 21 through the gate controller 19 or the gate timer 20.

As described above, in accordance with a method of producing a thin film magnetic head of the present invention, there is obtainable a thin film magnetic head which substantially suppresses a popcorn noise by conducting a heat treatment at a temperature of 270° C.–400° C. before forming a protective layer on a thin film magnetic circuit comprising a magnetic film and a conductive coil film on a substrate.

Obviously, numerous modifications and variations of the present invention are possible in light of the above teachings. It is therefore to be understood that within the scope of the appended claims, the invention may be practiced otherwise than as specifically described herein.

We claim:

1. A method of producing a thin film magnetic head which has a reduced popcorn noise comprising the steps of:
   forming a lower magnetic film on a substrate;
   forming a gap film on said lower magnetic film;
   forming a conductive coil film on said gap film;
   forming an upper magnetic film on said conductive coil film, wherein said substrate, said lower magnetic film, said gap film, said conductive coil film and said upper magnetic film comprise an intermediate structure;
   heating said intermediate structure to a temperature in a range of from 270° C. to 400° C. and for a time sufficient to produce the reduced popcorn noise;
   forming a protective layer on said heated intermediate structure.

2. The method of producing a thin film magnetic head according to claim 1, wherein the time sufficient to produce the reduced popcorn is for 10 minutes–200 minutes.

3. The method of producing a thin film magnetic head according to claim 1, wherein the thin film magnetic circuit is heated in a degree of vacuum of about $10^{-4}$–$10^{-6}$ Torr.

4. The method of producing a thin film magnetic head according to claim 3, wherein the thin film magnetic head is heated in a degree of vacuum of about $10^{-3}$–$10^{-5}$ Torr.

5. A method of producing a thin film magnetic head which has a reduced popcorn noise, comprising the steps of:
   forming a lower magnetic film on a substrate;
   forming a gap film on said lower magnetic film;
   forming a conductive coil film on said gap film;
   forming an upper magnetic film on said conductive coil film, wherein said substrate, said lower magnetic film, said gap film, said conductive coil film and said upper magnetic film comprise an intermediate structure;
   heating said intermediate structure to a temperature in a range of from 270° C. to 400° C. and for a time between 10 and 200 minutes to produce the reduced popcorn noise; and
   forming a protective layer on said heated intermediate structure.

6. The method of producing a thin film magnetic head according to claim 5, wherein said intermediate structure is heated for a time between 10 and 120 minutes.

7. The method of producing a thin film magnetic head according to claim 6, wherein said intermediate structure is heated for a time of 60 minutes at a temperature of 320° C.

* * * * *